United States Patent
Kang et al.

(10) Patent No.: US 9,852,038 B2
(45) Date of Patent: Dec. 26, 2017

(54) DEBUGGING SYSTEM AND DEBUGGING METHOD OF MULTI-CORE PROCESSOR

(71) Applicant: ALi Corporation, Hsinchu (TW)

(72) Inventors: Yu-Feng Kang, Guangdong (CN); Qian-Zhi Wang, Guangdong (CN)

(73) Assignee: ALi Corporation, Hsinchu (TW)

( * ) Notice: Subject to any disclaimer, the term of this patent is extended or adjusted under 35 U.S.C. 154(b) by 263 days.

(21) Appl. No.: 14/563,317

(22) Filed: Dec. 8, 2014

(65) Prior Publication Data
US 2016/0092327 A1    Mar. 31, 2016

(30) Foreign Application Priority Data
Sep. 26, 2014  (CN) .......................... 2014 1 0503979

(51) Int. Cl.
| G06F 11/00 | (2006.01) |
| G06F 11/26 | (2006.01) |
| G06F 11/22 | (2006.01) |
| G06F 11/36 | (2006.01) |

(52) U.S. Cl.
CPC .......... *G06F 11/26* (2013.01); *G06F 11/2242* (2013.01); *G06F 11/36* (2013.01)

(58) Field of Classification Search
CPC combination set(s) only.
See application file for complete search history.

(56) References Cited

U.S. PATENT DOCUMENTS

| 2004/0064757 | A1* | 4/2004 | Jahnke | ................ G06F 11/2242 714/37 |
| 2011/0072309 | A1* | 3/2011 | Sakai | .................... G06F 11/362 714/35 |
| 2012/0159261 | A1* | 6/2012 | Maybee | ................ G06F 11/362 714/38.13 |
| 2012/0210103 | A1* | 8/2012 | Liao | .................... G06F 11/3632 712/227 |

(Continued)

FOREIGN PATENT DOCUMENTS

| CN | 102955737 | 3/2013 |
| CN | 103154893 | 6/2013 |

(Continued)

OTHER PUBLICATIONS

"Office Action of China Counterpart Application", dated Aug. 25, 2017, pp. 1-13, in which the listed references were cited.

*Primary Examiner* — Michael Maskulinski
(74) *Attorney, Agent, or Firm* — J.C. Patents (57) ABSTRACT

The invention relates to a debugging system and a debugging method of a multi-core processor. The debugging system includes a debugging host, a target processor, and a mapping and protocol conversion device. The debugging host includes a debugger, and the target processor includes a plurality of cores. The mapping and protocol conversion device is connected between the debugging host and the target processor, identifies a core architecture to which each of the cores belongs, and maps each of the cores respectively to at least one thread of at least one process according to the core architecture to which each of the cores belongs. After- (Continued)

wards, the debugger executes a debugging procedure on the target processor according to the process and the thread corresponded to each of the cores.

15 Claims, 4 Drawing Sheets

(56) References Cited

U.S. PATENT DOCUMENTS

| | | | |
|---|---|---|---|
| 2013/0090887 A1* | 4/2013 | Deogharia | G01R 31/318555 702/120 |
| 2013/0238882 A1* | 9/2013 | Suzuki | G06F 9/30043 712/228 |
| 2014/0040665 A1* | 2/2014 | Aggarwal | G06F 11/3684 714/27 |
| 2014/0281735 A1* | 9/2014 | Olivarez | G06F 11/2242 714/40 |

FOREIGN PATENT DOCUMENTS

| | | |
|---|---|---|
| CN | 104050066 | 9/2014 |
| TW | 201235833 | 9/2012 |

* cited by examiner

DEBUGGING SYSTEM AND DEBUGGING METHOD OF MULTI-CORE PROCESSOR

CROSS-REFERENCE TO RELATED APPLICATION

This application claims the priority benefit of Chinese application serial no. 201410503979.4, filed on Sep. 26, 2014. The entirety of the above-mentioned patent application is hereby incorporated by reference herein and made a part of this specification.

FIELD OF THE INVENTION

The invention relates to a debugging system, and more particularly, to a debugging system and a debugging method for a multi-core processor.

DESCRIPTION OF RELATED ART

Figure 1:
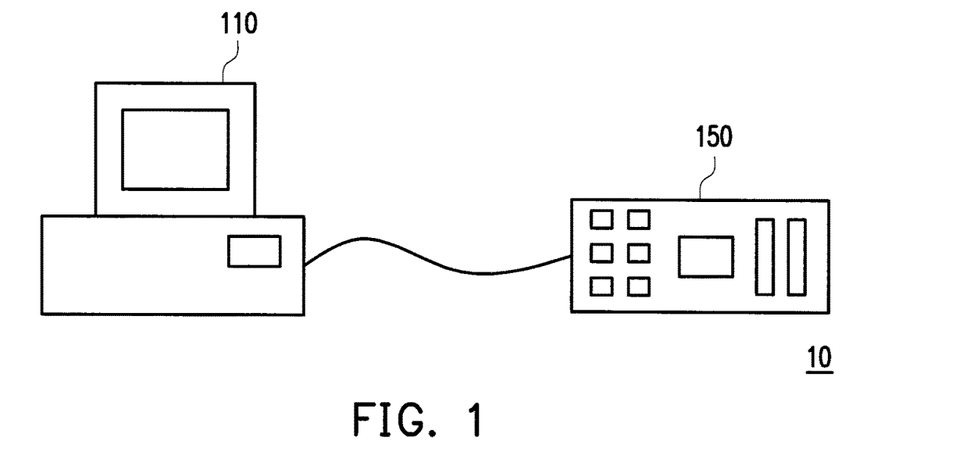
FIG. 1 is a schematic view illustrating a conventional debugging system.

With the advancement of technology, a multi-core processing architecture provides a streamlined size, low power consumption but powerful computing capability platform to fulfill the needs of various applications. For a typical multi-core architecture platform, it is necessary to use a debugger to carry out debugging errors during developing software. A conventional debugging system 10 as shown in FIG. 1 is an example, wherein a main frame 110 may include a debugging software, and a debug target system 150 including a processor to be debugged. With increased numbers of cores in the debug target system 150 and the complexity of the software, a comprehensive and effective debugging system is very important in terms of software developments.

Utilizing multi-core processors has currently become popular. A multi-core architecture platform has already been able to be fabricated with dozens of cores in some laboratories, and may be a heterogeneous multi-core platform which contains various cores of different types. However, each core is still deemed as an independent processor, and each requires a dedicated debugging system. If a multi-core architecture platform contains 20 cores, it means that 20 debugging systems as shown in FIG. 1 are required. It does not only complicate software and hardware of the debugging system and increase costs, but also cause inconvenience in operating the system. If a plurality of cores are dealing with the same task, the cores should start executions and enter debugging states synchronously. However, due to that the debuggers operate independently and time differences are generated from each operation by a user, it is difficult to reach synchronization.

In order to debug a plurality of cores in the heterogeneous multi-core processor, one of contemporary solutions is to renovate an entirely customized system. Such solution may be flexible, but it takes longer development cycle and complicates ways of maintaining software. In addition, another solution is to only debug or monitor an operation state of a single core at the same time, and then reach a goal of debugging and controlling different cores respectively by way of switching cores. However, such solution fails to reach the goal of debugging a plurality of cores synchronously.

SUMMARY OF THE INVENTION

In view of the above, the invention provides a debugging system and a debugging method of a multi-core processor, which may realize a debugging system of a multi-core processor having powerful functions without complex and colossal software developments, and achieve a goal of debugging a plurality of cores at the same time.

The invention provides a debugging system of a multi-core processor, which includes a debugging host, a target processor, and a mapping and protocol conversion device. The debugging host includes a debugger, and the target processor includes a plurality of cores. The mapping and protocol conversion device is connected between the debugging host and the target processor, identifies a core architecture of each of the cores, and maps each of the cores respectively to at least one thread of at least one process according to the core architecture to which each of the cores belongs. Afterwards, the debugger executes a debugging procedure on the target processor according to the process and the thread corresponded to each of the cores.

In an exemplary embodiment of the invention, the core architecture at least includes a first architecture and a second architecture. The mapping and protocol conversion device maps a first core among the cores which belongs to the first architecture to a first process among the processes, and maps a second core among the cores which belongs to the second architecture to a second process among the processes.

In an exemplary embodiment of the invention, the core architecture includes the first architecture, and the cores at least include a first core and a second core. When both the first core and the second core among the cores belong to the same first architecture, the mapping and protocol conversion device maps the first core and the second core together to a first process among the processes. In addition, the mapping and protocol conversion device maps the first core and the second core respectively to a first thread of the first process and a second thread of the first process.

In an exemplary embodiment of the invention, wherein the first core and the second core both belonging to the first architecture are operated in a symmetric multiprocessing state.

In an exemplary embodiment of the invention, the core architecture includes a first architecture, and the cores at least include a first core and a second core. When both the first core and the second core among the cores belong to the same first architecture, the mapping and protocol conversion device maps the first core to a first thread of a first process among the processes, and maps the second core to a second thread of a second process among the processes.

In an exemplary embodiment of the invention, a first core and a second core both belonging to the first architecture are operated in an asymmetric multiprocessing state.

In an exemplary embodiment of the invention, the debugging host includes a graphic user interface module. The graphic user interface module provides a user interface to receive an operating command, and a debugger outputs a debugging command which corresponds to the operating command to a mapping and protocol conversion device.

In an exemplary embodiment of the invention, the mapping and protocol conversion device includes a control server and a protocol conversion interface device. The control server is connected to the debugger through a network interface, and controls the cores to be mapped to threads of processes. The protocol conversion interface device is connected to the control server through a first transmission interface, and is connected to a target processor through a second transmission interface. The protocol conversion interface device converts data received from the control server into a signal which conforms to a protocol standard of the second transmission interface.

In an exemplary embodiment of the invention, when the debugger executes a debugging procedure on a target processor, the target processor outputs core debugging data associated with a first core of cores to a mapping and protocol conversion device. The mapping and protocol conversion device packages the core debugging data into a debugging message according to one of processes and one of threads corresponded to the first core, and transmits the debugging message back to the debugger.

In another aspect, the invention provides a debugging method of a multi-core processor, which is adapted for a debugging system. The debugging system includes a debugging host, a target processor and a mapping and protocol conversion device, and the target processor includes a plurality of cores. The debugging method includes the following steps: the target processor is connected to the mapping and protocol conversion device; the mapping and protocol conversion device identifies a core architecture to which each of the cores belongs, and maps each of the cores to at least one threads of at least one process according to the core architecture to which each of the cores belongs; afterwards, a debugger of the debugging host executes a debugging procedure on the target processor according to the process and the thread corresponded to each of the cores.

In view of the above, in the debugging system of the invention, on the basis that the debugger supports a debugging mechanism of multiple processes and multiple threads, each of the cores of the multi-core processor is mapped to corresponding process and thread, respectively, thereby using the debugger of the debugging host to debug each of the plurality of cores of the multi-core processor synchronously. Accordingly, the debugging system and the debugging method of the invention is adapted for a homogeneous multi-core processor and a heterogeneous multi-core processor, and may reduce costs of developing debugging systems and enhance convenience of using the debugging system.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention particularly.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
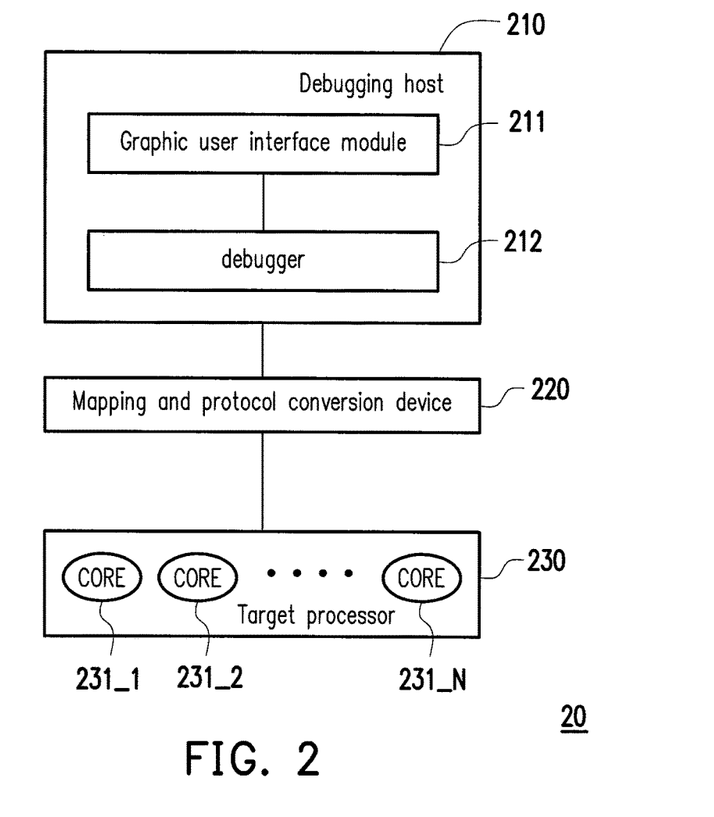
FIG. 2 is a schematic view illustrating a debugging system of a multi-core processor according to an embodiment of the invention.

FIG. 2 is a schematic view illustrating a debugging system of a multi-core processor according to an embodiment of the invention. With reference to FIG. 2, a debugging system 20 includes a debugging host 210, a mapping and protocol conversion device 220, and a target processor 230. The debugging host 210 may be but not limited to, for example, a desktop computer, a notebook computer, or other computing devices having computation functions. The target processor 230 is, for example, an embedded microprocessor packaged into a single chip or a microcontroller and the like, but the scope thereof is not limited thereto. In the present exemplary embodiment, the target processor 230 includes a plurality of cores 231_1 to 231_N, wherein N is any integer greater than 1, but the invention does not limit numbers of the cores. In addition, the target processor 230 may be a homogeneous-core processor or a heterogeneous-core processor, but is not limited in the invention. In other words, the cores 231_1 to 231_N may respectively belong to the same or different core architectures.

In the present exemplary embodiment, the debugging host 210 may receive an operation command issued by a user to debug the plurality of cores in the target processor 230, thereby determining whether the target processor 230 may operate normally. In the present exemplary embodiment, the debugging host 210 includes a graphic user interface module 211 and a debugger 212. In the present exemplary embodiment, the graphic user interface module 211 and the debugger 212 may include hardware components required for regular operations (e.g., processors, chipsets, controllers or specific circuits, storage units, etc.) and/or software components (e.g., software modules specialized for carrying out specific functions, etc.).

The debugger 212 may be a computer program or a tool for debugging other programs, and is capable of being allowed to check the target's running state and to execute debugging commands, so as to detect errors or bugs. For example, the debugger 212 may be GNU Debugger (GDB), which is capable of debugging and detecting errors in software programs that are executed in a variety of different core architectures. The core architectures, for example, may be but not limited to ARM developed by ARM Holdings plc, H8/300 developed by Hitachi Semiconductors, System/370 developed by IBM corporation, X86 and X86-64 developed by Intel corporation, Motorola 68000 developed by Motorola Inc., MIPS developed by MIPS Technologies, PA-RISC developed by HP, and the like.

The graphic user interface module 211 provides a user interface to receive an operating command. The debugger 212 outputs a debugging command corresponding to the operating command to the mapping and protocol conversion device 220. The debugging command, for example, is an ON debugging command, an OFF debugging command, a command for setting a breakpoint, or a command for setting a watchpoint, etc. In other words, the graphic user interface module 211 is configured for providing a user operation interface to a user, such that the user may issue a related command regarding debugging the target processor 230 via the user operation interface. In an exemplary embodiment, the graphic user interface module 211 and the debugger 212, for example, may be integrated into an integrated development environment (IDE). The IDE is an integrated debugging system software to be performed on the debugging host 210, which provides the user operation interface to the user for operating and issuing a command.

In the present exemplary embodiment, the mapping and protocol conversion device 220 is connected between the debugging host 210 and the target processor 230. The mapping and protocol conversion device 220 is configured for converting each core of the cores 231_1 to 231_N of the target processor 230 into a process or a thread, which may be identified and processed by the debugging host 210. The mapping and protocol conversion device 220, for example, is connected to the debugging host 210 via a universal serial bus (USB) protocol interface or a network interface (e.g., TCP/IP protocol interface), and the mapping and protocol conversion device 220, for example, is connected to the target processor 230 via a joint test action group (JTAG) protocol interface. The mapping and protocol conversion device 220 identifies the core architecture of each of the cores 231_1 to 231_N, and maps each of the cores to at least one thread of at least one process according to the responding core architecture.

Specifically, the mapping and protocol conversion device 220 may identify the core architecture of each of the cores 231_1 to 231_N, and determine the process and the thread corresponded to each of the cores 231_1 to 231_N based on the core architectures of each of the cores 231_1 to 231_N. Accordingly, the debugger 212 may execute a debugging procedure on the target processor 230 according to the process and the thread corresponded to each of the cores 231_1 to 231_N.

Specifically speaking, when the debugger 212 executes the debugging procedure on the target processor 230, the target processor 230 outputs core debugging data associated with each of the cores 231_1 to 231_N to the mapping and protocol conversion device 220. Following, the mapping and protocol conversion device 220 packages the core debugging data of each of the cores 231_1 to 231_N into a debugging message according to the corresponded process and thread, and transmits the debugging message back to the debugger 212. In view of this, the debugging host 210 does not only monitor the plurality of the cores 231_1 to 231_N of the target processor 230 at the same time, but also debug the plurality of the cores 231_1 to 231_N which belong to different core architectures via the powerful debugger 212.

In other words, when the debugging host 210 is debugging the target processor 230, the mapping and protocol conversion device 220 maps each of the cores 231_1 to 231_N respectively to a thread of at least one process. The debugger 212 may identify a multi-core hardware system as a system having multiple processes and multiple threads, thereby fulfilling an object of debugging heterogeneous and homogenous multi-core processors by means of a contemporary debugger.

Figure 3:
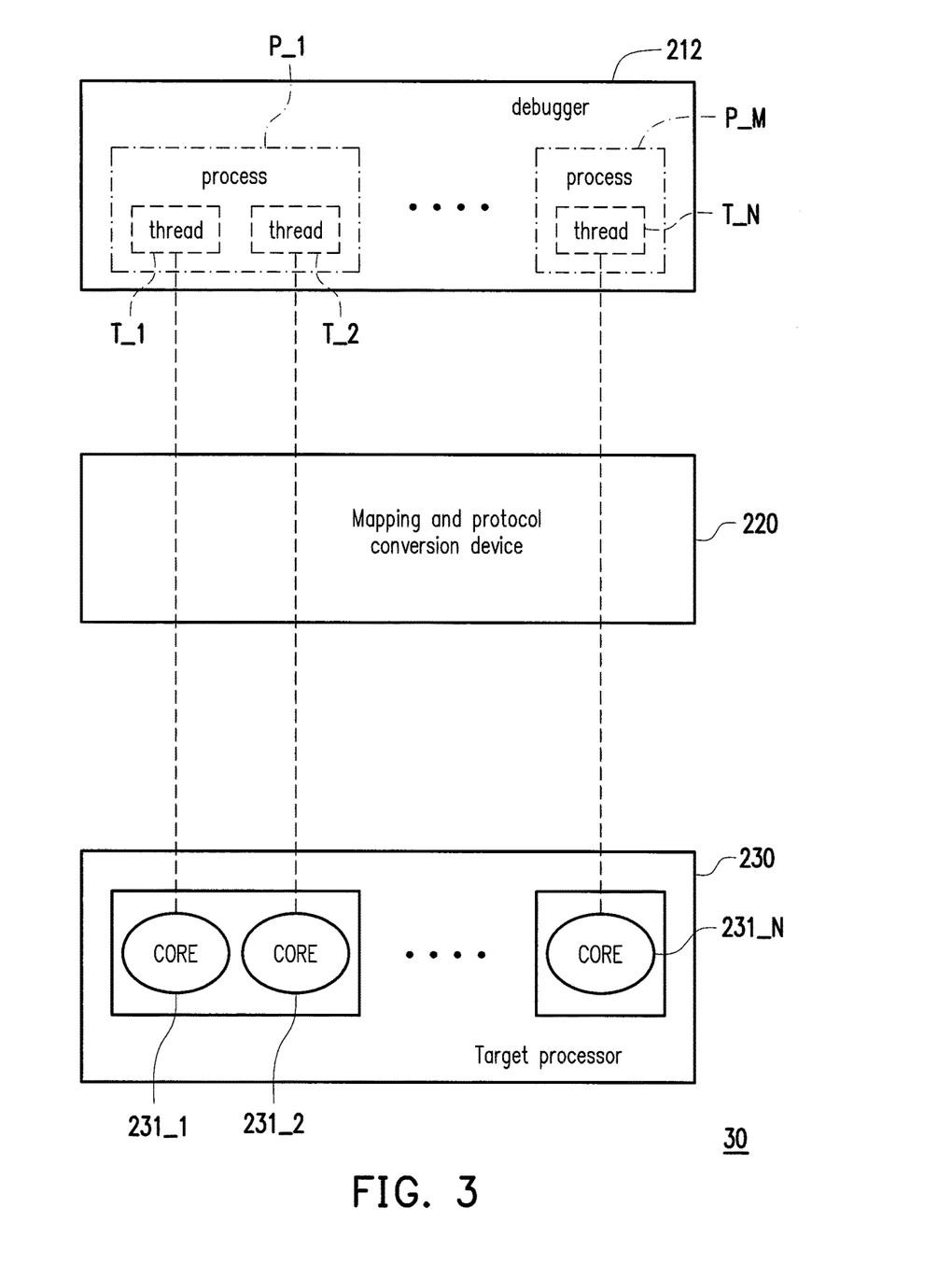
FIG. 3 is a schematic view illustrating an example of mapping a plurality of cores to processes and threads according to an embodiment of the invention.

The following are detailed descriptions of embodiments in order to further illustrate how to map the plurality of cores into processes and threads. FIG. 3 is a schematic view illustrating an example of mapping the plurality of cores to the processes and the threads according to an embodiment of the invention. In the present exemplary embodiment, the cores which belong to different core architectures are mapped to different software processes. With reference to FIG. 3, when the mapping and protocol conversion device 220 is connected to the target processor 230, the mapping and protocol conversion device 220 may identify the core architectures of the cores 231_1 to 231_N one by one, and map each of the cores 231_1 to 231_N respectively to threads T_1 to T_N of processes P_1 to P_M according to the core architecture to which each of the cores 231_1 to 231_N belongs.

Specifically, in the exemplary embodiment illustrated in FIG. 3, it is assumed that both the core architectures of the core 231_1 and the core 231_2 belong to first architecture, and the core architecture of the core 231_N belongs to the second architecture which is different from the first architecture. In other words, the target processor 230 of the present exemplary embodiment is a heterogeneous multi-core processor. In the present exemplary embodiment, the mapping and protocol conversion device 220 maps the cores which belong to different architectures to different processes, respectively. For example, among the cores 231_1 to 231_N, the core 231_1 which belongs to the first architecture is mapped to the process P_1 among the processes P_1 to P_M, and the core 231_N which belongs to the second architecture is mapped to the process P_M which is different from the process P_1. Furthermore, the mapping and protocol conversion device 220 may map the core 231_1 to the thread T_1 of the process P_1, and map the core 231_N to the thread T_N of process P_M.

It should be further noted that, in implementing an embodiment, for the core 231_1 and the core 231_2 which belong to the same first architecture, the mapping and protocol conversion device 220 may further determine the processes and the threads corresponded to the core 231_1 and the core 231_2 respectively according to a coupling relationship between the core 231_1 and the core 231_2. For example, the core 231_1 is mapped to a thread of the process P_1, and the core 231_2 is mapped to a thread of the process P_2. However, the invention is not limited thereto. In another embodiment, the mapping and protocol conversion device 220 may also map the core 231_1 and the core 231_2 which belong to the same first architecture directly to different threads (e.g., the thread T_1 and the thread T_2) of the same process (e.g., the process P_1). This will be discussed with reference to the following embodiments, respectively.

In the exemplary embodiment as illustrated in FIG. 3, the core 231_1 and the core 231_2 among the cores 231_1 to 231_N belong to the same first architecture, and the core 231_1 and the core 231_2 are operated in a symmetric multiprocessing (SMP) state. Accordingly, the mapping and protocol conversion device 220 maps the core 231_1 and the core 231_2 together to the same process P_1 among the processes P_1 to P_M, and the mapping and protocol conversion device 220 maps the core 231_1 and the core 231_2 respectively to the thread T_1 and the thread T_2 of the process P_1.

In another exemplary embodiment, a first core and a second core among the plurality of cores belong to the same first architecture, but the first core and the second core are operated in an asymmetric multiprocessing (non-SMP) state. Accordingly, the mapping and protocol conversion device 220 may map the first core and the second core respectively to the threads of different processes. For example, the mapping and protocol conversion device 220 may map the first core to a first thread of a first process, and map the second core to a second thread of a second process, wherein the first process is different from the second process, and the first thread is different from the second thread. It should be noted that the invention is not limited to the above embodiments which illustrate methods of mapping different cores of the same architecture. For example, the cores 231_1 and 231_2 which are operated in the SMP state under the same architecture may also be mapped respectively to different threads of different processes. Alternatively, the cores operated in the non-SMP state under the same architecture may also be mapped to the same process and then be respectively corresponded to different threads.

Figure 4:
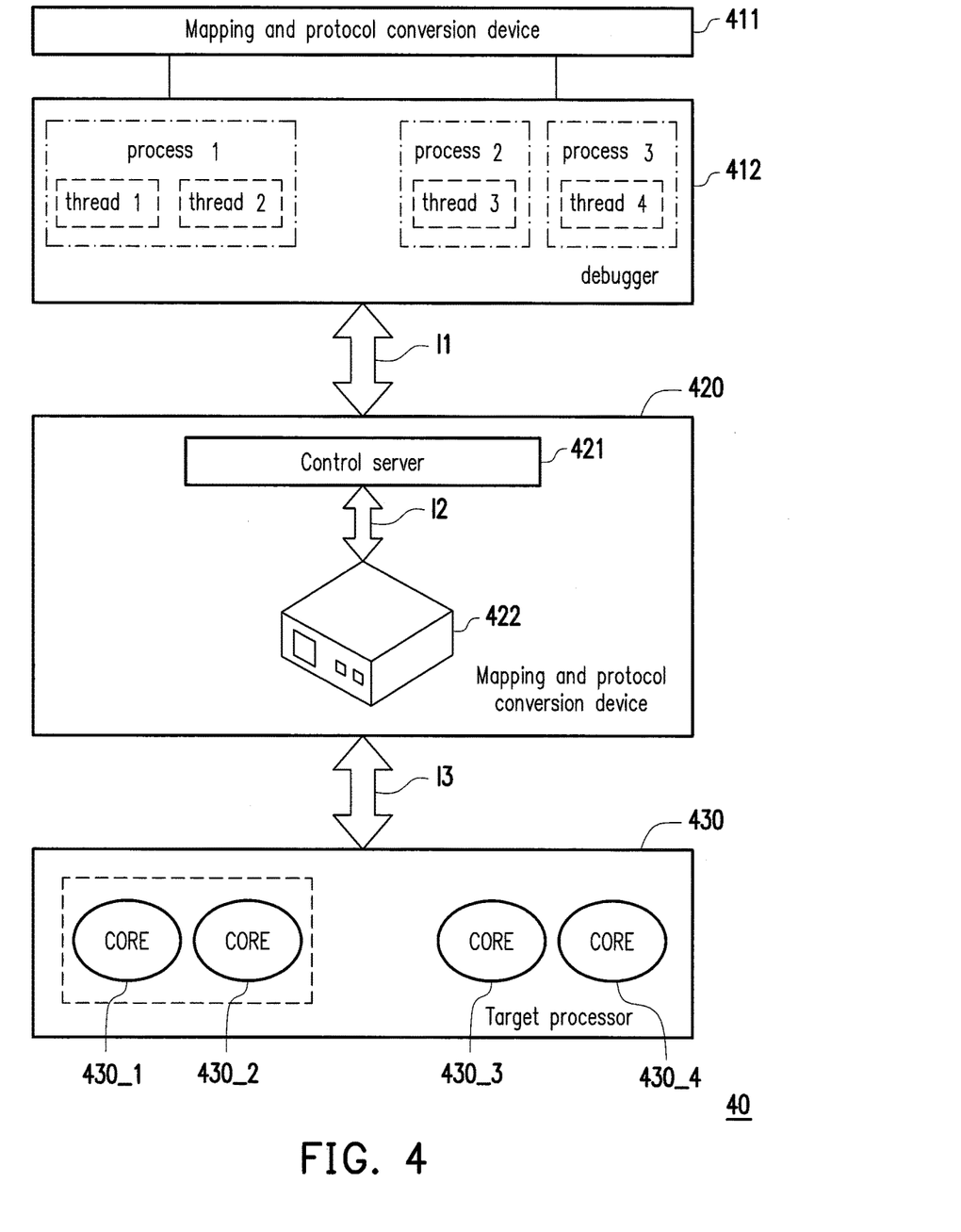
FIG. 4 is a schematic view illustrating a debugging system of a multi-core processor according to another embodiment of the invention.

FIG. 4 is a schematic view illustrating a debugging system of a multi-core processor according to another embodiment of the invention. With reference to FIG. 4, a debugging system 40 includes a graphic user interface module 411, a debugger 412, a mapping and protocol conversion device 420, and a target processor 430. Functions and coupling relationships thereof are the same or similar to the graphic user interface module 211, the debugger 212, the mapping and protocol conversion device 220 and the target processor 230 as illustrated in FIG. 2, and are not iterated hereinafter.

Differences between the previous embodiment and the present exemplary embodiment lie in that the mapping and protocol conversion device 420 of the present exemplary embodiment may include a control server 421 and a protocol conversion interface device 422. In addition, the target processor 430 of the present exemplary embodiment includes four cores 430_1 to 430_4. The control server 421 is connected to the debugger 412 through a network interface I1, which is, for example, a standard remote serial protocol (RSP) interface for performing GDB. The control server 421 controls the cores 430_1 to 430_4 to be respectively mapped to "thread 1", "thread 2", "thread 3" and "thread 4" of "process 1", "process 2" and "process 3".

The protocol conversion interface device 422 is connected to the control server 421 through a transmission interface I2, and is connected to the target processor 430 through a transmission interface I3. The protocol conversion interface device 422 converts data received from the control server 421 into a signal which conforms to protocol standards of the transmission interface I3. For example, the transmission interface I2 is USB transmission interface, while the transmission interface I3 is JTAG protocol transmission interface. In view of this, the protocol conversion interface device 422 may convert a signal transmitted by the USB transmission interface into a JTAG protocol signal which is actually used in a hardware simulator configured for simulating processors.

In the present exemplary embodiment, it is assumed that the core architectures of the core 430_1 and the core 430_2 belong to the same first architecture (e.g., ARM architecture), and it is also assumed that the core architectures of the core 430_3 and the core 430_4 belong to the same second architecture (e.g., MIPS architecture). In addition, the core 430_1 and the core 430_2 are operated in the SMP state, and the core 430_3 and the core 430_4 are operated in the non-SMP state. Accordingly, the control server 421 may map the core 430_1 and the core 430_2 respectively to "thread 1" and "thread 2" of the same "process 1". Furthermore, the control server 421 maps the core 430_3 to "thread 3" of "process 2" and maps the core 430_4 to "thread 4" of "process 3".

In other words, the control server 421 maps the core 430_1 and the core 430_2, which are operated in the SMP state and belong to the ARM architecture, to two threads of the same process, and the debugger 412 supporting an ARM version is in charge of carrying out a debugging procedure. In view of this, the debugger 412 may only detect one process which contains two threads, and would not receive any core information regarding the core 430_1 and the core 430_2.

In another aspect, the control server 421 maps the core 430_3 and the core 430_4, which are operated in the non-SMP state and belong to the MIPS architecture, respectively to threads of two independent processes, and the debugger 412 supporting a MIPS version is in charge of carrying out a debugging procedure. In view of this, the debugger 412 may only detect two processes and each contains one thread, and would not receive any core information regarding the core 430_3 and the core 430_4.

The first architecture and the second architecture in the above embodiment are merely exemplary. However, the invention does neither limit numbers of the architecture types, nor the numbers of cores corresponding to each architecture type.

From the perspective of the debugger 412, only standard information regarding the processes and the threads is seen. Therefore, a communication protocol between the debugger 412 and the control server 421 also remains unchanged. Accordingly, a task on debugging a homogeneous or heterogeneous processor may be completed entirely by means of the contemporary debugger 412 and the graphical user interface module 411, and a great deal of development efforts may be minimized.

Figure 5:
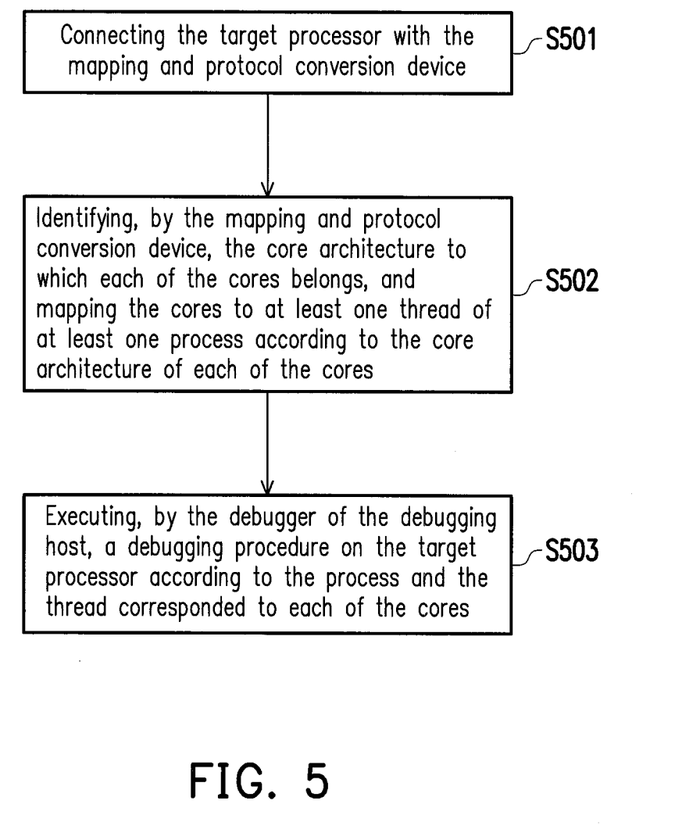
FIG. 5 is a flowchart illustrating a debugging method according to an embodiment of the invention.

FIG. 5 is a flowchart illustrating a debugging method according to an embodiment of the invention, and the flowchart is adapted for the debugging system 20 as illustrated in FIG. 2. With reference to FIG. 2 and FIG. 5 together, in a step S501, the target processor 230 is connected to the mapping and protocol conversion device 220. In a step S502, the mapping and protocol conversion device 220 identifies a core architecture of each of the cores 231_1 to 231_N, and maps the cores 231_1 to 231_N to the threads of the at least one process according to the corresponding core architecture types. In a step S503, the debugger 212 of the debugging host 210 executes a debugging procedure on the target processor 230 according to the process and the thread corresponded to each of the cores 231_1 to 231_N.

In summary, the mapping and protocol conversion device of the invention may map each of the cores of the multi-core processor to the corresponding process and thread, respectively, such that the debugger of the debugging host may carry out debugging the plurality of cores of the multi-core processor synchronously, and the debugging system of the invention is adapted to both the homogeneous multi-core processor and the heterogeneous multi-core processor. In addition, the invention may complete a debugging task on the heterogeneous multi-core processor entirely by means of a contemporary software debugger, such that a great deal of development efforts may be minimized and costs of fabricating a hardware simulator may be reduced.

Although the present invention has been disclosed by the above embodiments, they are not intended to limit the present invention. Any person skilled in the art can make modifications and variations without departing from the spirit and scope of the present invention. Therefore, the protection scope of the present invention falls in the appended claims.

What is claimed is:

1. A debugging system of a multi-core processor, comprising:
   a debugging host comprising a debugger executed by a processor of the debugging host;
   a target processor comprising a plurality of cores; and
   a mapping and protocol conversion device being connected between the debugging host and the target processor, identifying a core architecture of each of the cores, and mapping each of the cores respectively to at least one thread of at least one process of the debugger according to the core architecture to which each of the cores belongs, wherein the mapping and protocol conversion device comprises:

a control server being connected to the debugger through a network interface, controlling the cores being mapped to the threads of the processes; and a protocol conversion interface device being connected to the control server through a first transmission interface, and being connected to the target processor through a second transmission interface, wherein the protocol conversion interface device converts data received from the control server into a signal conforming to a protocol standard of the second transmission interface, wherein the debugger executes a debugging procedure for the target processor to debug the cores of the target processor synchronously through executing the process and the thread corresponded to each of the cores by the processor.

2. The debugging system as claimed in claim 1, wherein the core architecture at least comprises a first architecture and a second architecture, the mapping and protocol conversion device maps a first core among the cores belonging to the first architecture to a first process among the processes and maps a second core among the cores belonging to the second architecture to a second process among the processes.

3. The debugging system as claimed in claim 1, wherein the core architecture comprises a first architecture, the cores at least comprise a first core and a second core, when both the first core and the second core belong to the first architecture, the mapping and protocol conversion device maps the first core and the second core together to a first process among the processes, and the mapping and protocol conversion device maps the first core and the second core respectively to a first thread of the first process and a second thread of the first process.

4. The debugging system as claimed in claim 3, wherein the first core and the second core are operated in a symmetric multiprocessing state.

5. The debugging system as claimed in claim 1, wherein the core architecture comprises a first architecture, the cores at least comprise a first core and a second core, when both the first core and the second core belong to the first architecture, the mapping and protocol conversion device maps the first core to a first thread of a first process among the processes, and the mapping and protocol conversion device maps the second core to a second thread of a second process among the processes.

6. The debugging system as claimed in claim 5, wherein the first core and the second core are operated in an asymmetric multiprocessing state.

7. The debugging system as claimed in claim 1, wherein the debugging host comprises a graphic user interface module, the graphic user interface module provides a user interface to receive an operating command, the debugger outputs a debugging command corresponding to the operating command to the mapping and protocol conversion device.

8. The debugging system as claimed in claim 1, wherein, when the debugger executes the debugging procedure on the target processor, the target processor outputs core debugging data associated with a first core among the cores to the mapping and protocol conversion device, the mapping and protocol conversion device packages the core debugging data into a debugging message according to one of the processes and one of the threads corresponded to the first core and transmits the debugging message back to the debugger.

9. A debugging method of a multi-core processor, adapted for a debugging system, the debugging system comprising a debugging host, a target processor and a mapping and protocol conversion device, and the target processor comprising a plurality of cores, wherein the debugging method comprises:

connecting the target processor to the mapping and protocol conversion device;

identifying a core architecture to which each of the cores belongs by the mapping and protocol conversion device, and mapping each of the cores to at least one thread of at least one process of a debugger of the debugging host according to the core architecture of each of the cores, wherein the mapping and protocol conversion device comprises a control server and a protocol conversion interface device, the control server is connected to the debugger through a network interface, and the protocol conversion interface device is connected to the control server through a first transmission interface and is connected to the target processor through a second transmission interface, wherein the step of mapping each of the cores to the at least one thread of the at least one process of the debugger of the debugging host according to the core architecture of each of the cores comprises:

controlling the cores being mapped to the threads of the processes by the control server; and converting data received from the control server into a signal conforming to a protocol standard of the second transmission interface by the protocol conversion interface device; and executing a debugging procedure for the target processor by the debugger, executed by a processor of the debugging host, of the debugging host so as to debug the cores of the target processor synchronously through executing the processes and the threads corresponded to each of the cores by the processor.

10. The debugging method as claimed in claim 9, wherein the core architecture at least comprises a first architecture and a second architecture, the mapping and protocol conversion device maps a first core among the cores belonging to the first architecture to a first process among the processes, and maps a second core among the cores belonging to the second architecture to a second process among the processes.

11. The debugging method as claimed in claim 9, wherein the core architecture comprises a first architecture, the cores at least comprise a first core and a second core, when both the first core and the second core belong to the first architecture, the mapping and protocol conversion device maps the first core and the second core together to a first process among the processes, and the mapping and protocol conversion device maps the first core and the second core respectively to a first thread of the first process and a second thread of the first process.

12. The debugging method as claimed in claim 11, wherein the first core and the second core are operated in a symmetric multiprocessing state.

13. The debugging method as claimed in claim 9, wherein the core architecture comprises a first architecture, the cores at least comprise a first core and a second core, when both the first core and the second core belong to the first architecture, the mapping and protocol conversion device maps the first core to a first thread of a first process among the processes, the mapping and protocol conversion device maps the second core to a second thread of a second process among the processes.

14. The debugging method as claimed in claim 13, wherein the first core and the second core are operated in an asymmetric multiprocessing state.

15. The debugging method as claimed in claim 9, further comprising:
- outputting core debugging data associated with a first core among the cores by the target processor to the mapping and protocol conversion device when the debugger executes the debugging procedure on the target processor; and
- packaging the core debugging data into a debugging message by the mapping and protocol conversion device according to one of the processes and one of the threads corresponded to the first core, and transmitting the debugging message back to the debugger.

* * * * *